United States Patent Office 3,524,883
Patented Aug. 18, 1970

3,524,883
LESS THAN FULLY ALKYLATED HYDROXY ALKYL ETHYLENE DIAMINE
Paul W. Kersnar and Samuel Taormina, San Francisco, Calif., assignors to Progressive Products Co., San Francisco, Calif., a corporation of California
No Drawing. Continuation-in-part of applications Ser. No. 640,389, May 22, 1967, and Ser. No. 652,183, July 10, 1967, the former being a division of application Ser. No. 476,193, July 30, 1965, and the latter being, in turn, a continuation-in-part of application Ser. No. 578,963, Sept. 13, 1966. This application July 15, 1968, Ser. No. 744,635
The portion of the term of the patent subsequent to Aug. 20, 1985, has been disclaimed
Int. Cl. C07c 89/02, 91/08, 91/12
U.S. Cl. 260—584   7 Claims

ABSTRACT OF THE DISCLOSURE

Ethylene diamine is less than fully alkylated in the ratio of 1 mol with 2.5 to 3.5 mols of hydroxy alkyl groups of between 2–12 carbon atoms, thereby leaving free terminal hydrogen attached directly to at least some of the nitrogen of ethylene diamine for obtaining further reaction products useful as cleaning compositions and for ion sequestering.

REFERENCE TO COPENDING APPLICATIONS

This application is a continuation-in-part of applicants' copending application Ser. No. 640,389 filed May 22, 1967 for "Less Than Fully Propylated (Beta Hydroxy Propyl) Ethylene Diamine and Method of Preparation Thereof," now Pat. No. 3,398,198, granted Aug. 20, 1968, which in turn is a divisional application of applicants' parent application Ser. No. 476,193, filed July 30, 1965 for "Cleaning Composition, and Method of Cleaning and Sequestering Metal Ions," now Pat. No. 3,398,097, granted Aug. 20, 1968. Also, it is a continuation-in-part as to certain subject matter disclosed and claimed in applicants' copending application Ser. No. 652,183, filed July 10, 1967, for "Chelating and Cleaning Compound, and Method" which in turn is a continuation-in-part of subject matter disclosed but not claimed in applicants' copending application, Ser. No. 578,963, filed Sept. 13, 1966 for "Bis (Beta Hydroxy Propyl) Ethylene Diamine, and Method of Preparation, now Pat. No. 3,454,647 granted July 8, 1969.

This invention relates to detergent type cleaning and ion sequestering compositions, and to a particular type of intermediate for the preparation thereof and which has inherent detergent and metal ion sequestering properties.

BACKGROUND OF THE INVENTION

In applicants' copending applications Ser. Nos. 640,389 and 476,193 (Pats. Nos. 3,398,198 and 3,398,097, respectively) an intermediate having properties of those more generically disclosed herein comprises the reaction product of 2 to 3.5 mol of propylene oxide and 1.0 mol of ethylene diamine, thus forming a mixture of mono bis, tris and tetra (beta hydroxy propyl) ethylene diamine whereby free hydrogen atom is attached directly to at least some of the nitrogen of the reaction product; the number of free hydrogen atoms depending on the molar ratio of propylene oxide to ethylene diamine.

The patent to Lundsted et al. 2,697,118, dated Dec. 14, 1954, teaches totally hydroxy propylated ethylene diamine but because of being totally propylated, free terminal hydrogen is not available for obtaining advantageous reaction products with other compounds.

SUMMARY AND OBJECTS

Summarizing the instant invention, applicants have now found that other hydroxy alkyl groups can be substituted for some or all of the beta hydroxy propyl groups within an effective molar ratio of 2.5 to 3.5 mol of hydroxy alkyl groups to 1.0 mol of ethylene diamine to provide a less than fully hydroxy alkylated intermediate having comparable and in many instances improved properties compared to the less than fully propylated (beta hydroxy propyl) ethylene diamine intermediate, as long as the hydroxy alkyl intermediate hereof is not completely or fully alkylated so as to leave free hydrogen available for reaction with other compounds. Moreover, in alkylating the ethylene diamine the reaction method need not be as carefully controlled as required when alkylating ethylene diamine alone with propylene oxide.

All the intermediates hereof when reacted with 2.0 to 0.5 mol of monochloracetic acid per mol of ethylene diamine and an alkali metal hydroxide in the molar ratio of said monochloracetic acid of at least about 2.0 to 1, provide superior ion sequestering agents, particularly for iron, as is disclosed in applicants' aforementioned copending application, Ser. No. 652,183. Also, it has now been found that when the total number of hydroxy (OH) groups of the intermediate is at least 4 or more, the resultant acetate reaction product has greater heat stability. In other words, it is capable of working efficiently at high temperatures as well as at low or room temperatures.

The hydroxy alkyl groups may vary from 2 to 12 carbon atoms ($C_2$–$C_{12}$); and suitable groups attached to the ethylene diamine nucleus are the aforementioned beta hydroxy propyl, and hydroxy ethyl, 1,2-dihydroxy propyl, beta hydroxy butyl and beta hydroxy lauryl groups. Except when ethylene diamine itself and propylene oxide are reacted as disclosed in the aforementioned applications, these groups are readily substituted on the ethylene diamine nucleus by conventional alkylating procedures.

From the preceding, it is seen that the invention has as its objects among others the provision of an improved intermediate and composition of less than fully alkylated hydroxy alkylated ethylene diamine wherein hydroxy alkyl groups besides the beta hydroxy propyl group may be substituted in the aforementioned molar ratios, for hydrogen of ethylene diamine and still provide a useful detergent and cleaning composition as well as an intermediate for reaction with other compounds for such purposes.

DETAILED DESCRIPTION

In forming the reaction products with ethylene diamine in the 2.5 to 3.5 molar ratio of hydroxy alkyl groups to 1.0 of ethylene diamine, the product will be predominantly a mixture of bis and tris hydroxy alkyl ethylene diamine with only minor amounts of mono and tetra compounds formed. At the about 2 to 1 molar ratio, more of the bis compound forms than the tris, while at the molar ratio of about 3 to 1, which is the most effective intermediate compound hereof, it has presently been found that the predominant reaction product, namely the major quantity of the total of the mono, bis, tris, and tetra compounds, is tris hydroxy alkyl ethylene diamine. This is because ethylene diamine which has the formula

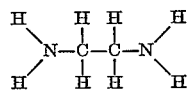

has four available hydrogens which can be replaced by hydroxy alkyl groups; and during alkylation a mixture of all of the mono, bis, tris, and tetra compounds form but the predominant compound is determined by the molar ratio of the reactants which form the hydroxy alkyl groups on the ethylene diamine, to the ethylene diamine.

The mixture which consists essentially or predominantly of the tris hydroxy alkyl ethylene diamine, provides the most effective intermediate hereof because of the presence of at least 3 hydroxy alkyl groups, leaving free hydrogen attached to nitrogen available for further reaction. Consequently, formation of a totally alkylated product is to be avoided. To obtain the predominantly tris hydroxy alkylated ethylene diamine, the reaction should be such that 2.8 to 3.3 mols of reactants which form the hydroxy alkyl groups be reacted with 1 mol of ethylene diamine. The hydroxy alkyl groups are desirably 2–12 carbon atom groups with best results with at least one of such groups over 2 carbon atoms.

The advantageous, predominantly tris hydroxy alkyl ethylene diamine has the following formula:

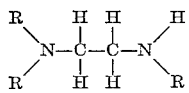

wherein R is a terminal hydroxy alkyl group of from 2 to 12 carbon atoms. Typical hydroxy alkyl groups are the aforementioned beta hydroxy propyl ($C_3H_6OH$) disclosed in applicants' aforementioned applications, and hydroxy ethyl ($C_2H_4OH$), 1,2-dihydroxy propyl (glyceryl-$C_3H_5(OH)_2$), beta hydroxy butyl ($C_4H_8OH$), and beta hydroxy lauryl ($C_{12}H_{24}OH$).

It will be noted that the 1,2-dihydroxy propyl (glyceryl) group contains two hydroxy (OH) groups. It has been found pursuant to this invention that the more the total of hydroxy groups in the total number of alkyl groups attached to the ethylene diamine, the greater the heat stability the intermediate has when employed for chelating purposes, particularly iron ions, and free hydrogen of the intermediate is replaced by an alkali metal acetate, such as sodium acetate, as is disclosed in applicants' aforementioned application, Ser. No. 652,183. Hence, the 1,2-dihydroxy propyl group is advantageous for such purpose because of containing two hydroxy groups; and as will be pointed out later in greater detail, when the intermediate contains 3 glyceryl groups, thus providing 6 hydroxy groups, superior ion chelation is obtained even if the intermediate is not reacted to form the monoacetate salt.

Also, as is disclosed in aforementioned applications Ser. Nos. 640,389, and 476,193 (Pat. Nos. 3,398,198 and 3,398,097, respectively), the intermediates hereof are useful per se in aqueous solution as a detergent and as a metal ion sequestering agent. They can also be employed as an organic alkali, an acid acceptor or adsorbent, can be admixed with inorganic phosphates in various proportions to provide improved detergents for laundering textiles, and as an alkali builder substitute in quaternary ammonium detergent formulations for inorganic alkalis such as trisodium phosphate, tetrapotassium pyrophosphate, tetrasodium ethylene diamine acetate, or the like.

Of particular usefulness in detergents is the reaction product of the intermediates with sulfonic acids, especially benzene sulfonic acid (either branch chain or linear alkylated) having an alkyl group varying from $C_{9-15}H_{19-31}$ attached to the benzene, and advantageously dodecyl benzene sulfonic acid. The molar ratio of the sulfonic acid to the intermediate may vary widely, depending on the particular purpose for which the composition is adapted. Soaps formed with saturated fatty acids, such as stearic acid and with unsaturated fatty acids, such as oleic, are also advantageous reaction products for detergent purposes. An advantageous carbonyl group for unsaturated fatty acids may vary from $C_{14-18}H_{27-35}$, and for saturated fatty acids from $C_{14-19}H_{29-39}$. As with respect to sulfonic acids, the molar ratio of the intermediate to fatty acids may also vary widely.

The concentration of the intermediates hereof in the aqueous vehicle may vary widely, and this is also true with respect to salts or complexes which may be formed therewith for various uses.

The reaction products of the intermediates with dodecyl benzene sulfonic acid in aqueous solution, at a pH of about 9.5, has been found extremely valuable as a blood stain remover, and at a pH of about 8.5, a very effective cleaner for hard surfaces, such as walls, floors, plastics, and metal such as chromium. In this connection, pH can be readily controlled by the amount of the organic acid reacted with the intermediates hereof.

An advantageous property of the less than fully alkylated hydroxy alkyl ethylene diamine hereof, is its resistance to change in pH (buffering capacity) when reacted with dodecyl benzene sulfonic acid, and oleic acid. Thus, with about a 3.3 molar reaction of alkyl groups to ethylene diamine, there is very little change in pH between 8 and 10 when, for example, from between 10 grams to 70 grams of dodecyl benzene sulfonic acid are titrated potentiometrically with 393 grams of a 25 percent aqueous solution of the reaction product. With oleic acid under the same conditions, there was very little change in pH between 10 and 85 grams of oleic acid. This a very useful property in formulating various types of cleaners by reacting the intermediate with sulfonic and fatty acids, as the resultant salts can be readily employed in a variety of types of laundering and dry cleaning systems where pH is important.

A most advantageous acid addition salt is that of dodecyl benzene sulfonic acid (either branch chain or linear alkylated) with the aforementioned intermediates. Generally, advantageous cleaning compositions are obtained by reaction of 1 mol of the intermediate reaction product to about 0.06 to 1.2 mols of dodecyl benzene sulfonic acid to provide a pH varying from 5.5 to 10.5 in concentrations of 0.05 to 99 percent by weight of an aqueous solution thereof based on the total amount of the solution. All that need be done in forming the salt is to mix the desired amount of dodecyl benzene sulfonic acid in an aqueous solution of the intermediate.

A particular important use is that of blood stain removal which is one of the most difficult of stains to remove when dry and set. Generally, effective blood stain removal compositions comprise the alkylated reaction product of any of the intermediates hereof to provide predominantly 3 alkyl groups and one free terminal hydrogen, with about 0.06 to 0.5 mols of dodecyl benzene sulfonic acid, in concentrations of about 0.05 to 99 percent by weight of such salt in aqueous solution based upon the total amount of the solution, with a pH varying from 8.5 to 10.5, and desirably in a concentration in water of about 7% by weight.

Applicant's aforementioned applications disclose the process by which the intermediate is formed by the reaction product of ethylene diamine itself and propylene oxide wherein propylene oxide is gradually added to an aqueous solution of ethylene diamine under non-forcing conditions and the reaction allowed to proceed exothermically; the initial concentration of ethylene diamine in the solution being less than about 35 percent by weight to avoid formation of a solid product.

The other particular intermediates hereof can be prepared by simple alkylation procedures starting with ethylene diamine having substituted hydroxy alkyl groups or with ethylene diamine itself. For example, monohydroxy ethyl ethylene diamine, namely ethylene diamine which has one substituted hydroxy ethyl group which is an article of commerce, may be employed as a starting compound. Another example of substituted ethylene diamine useful as a starting compound for forming the intermediate, is bis(beta hydroxy propyl) ethylene diamine made in the manner disclosed in applicants' copending application, Ser. No. 578,963, filed Sept. 13, 1966 (now Pat. No. 3,454,647 granted July 8, 1969), entitled "Bis (Beta Hydroxy Propyl) Ethylene Diamine, and Method of Preparation" wherein propylene oxide is added to an aqueous solution of ethylene diamine in which the initial concentration of ethylene diamine is above 35% and the amount of propylene oxide added is sufficient to form a precipitate of the bis compound which can be isolated.

When these hydroxy alkyl ethylene diamines are employed as the starting material, simple alkylation procedures may be followed to substitute the additional hydroxy alkyl group or groups. If the alkylating agent is an olefin oxide, the lower molecular weight oxides such as propylene oxide and butylene oxide will react in aqueous media with the substituted ethylene diamines exothermically and without any particular requirement of temperature control. When the olefin oxide is of a higher molecular weight, such as lauryl olefin oxide, the reaction with the substituted ethylene diamine requires prolonged heating of from 15 to 24 hours at about 100° C. to cause the reaction.

Other alkylating agents for example, halogenated hydroxy alkyl compounds such as glyceryl monochlorohydrin, may be employed. When these are employed in the normal manner in aqueous media, temperatures of about 85° C. for a period of one-half hour are suitable. In this latter instance, an alkali such as sodium hydroxide must be present to react with the hydrogen chloride formed to drive the reaction to completion. The described alkylating agents are by way example only, as other suitable alkylation procedures can be employed.

The following are typical examples for preparation of various intermediates hereof. In all the examples X represents the ethylene diamine nucleus of the following structure:

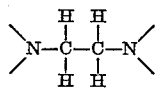

E represents the hydroxy ethyl group:

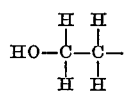

P the beta hydroxy propyl group:

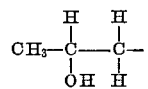

and G the 1,2-dihydroxy propyl (glyceryl) group:

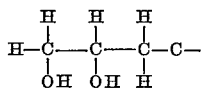

EXAMPLE I

Preparation of essentially bis(beta hydroxy propyl), hydroxy ethyl ethylene diamine having the following formula

1 mol (104 grams) of hydroxyethyl ethylene diamine

was dissolved in 1105.5 grams of water and 2 mols (116 grams) of propylene oxide were then added gradually, and the reaction allowed to proceed exothermically to completion under atmospheric conditions which can be ascertained when the odor of the propylene oxide can no longer be detected. The resultant solution contained about 16% by weight of the product.

EXAMPLE II

Preparation of mono(beta hydroxy propyl) bis hydroxy ethyl ethylene diamine

1 mol (148 grams) of bis hydroxy ethyl ethylene diamine was dissolved in 1049.5 grams of water. 1 mol (58 grams) of propylene oxide was then gradually added. The resultant solution had a concentration of about 16% by weight of product.

EXAMPLE III

Preparation of tris 1,2-dihydroxy propyl (tri-glyceryl) ethylene diamine

1 mol (60 grams) of ethylene diamine was dissolved in 895.5 grams of water, 3 mols (120 grams) of sodium hydroxide were then added and dissolved, 3 mols (331.5 grams) of glyceryl monochlorohydrin were then added. The entire mixture was agitated and heated to about 85° C. and held at that temperature until titration for sodium chloride showed the reaction to be complete, which occurred in about 2 hrs. The resultant solution had about 20% by weight of product.

EXAMPLE IV

Preparation of bis hydroxy ethyl, mono 1,2-dihydroxy propyl (glyceryl) ethylene diamine

1 mol (148 grams) of bis hydroxy ethyl ethylene diamine was dissolved in 637 grams of water; and 1 mol (110.5 grams) of glyceryl monochlorohydrin and 1 mol (40 grams) of sodium hydroxide was added, and the reaction was effected as in Example III. The resultant solution had a concentration of about 24% by weight of product.

EXAMPLE V

Preparation of bis(beta hydroxy propyl) mono 1,2-dihydroxy propyl (glyceryl) ethylene diamine

1 mol (176 grams) of bis(beta hydroxy propyl) ethylene diamine was dissolved in 1149 grams of water; and 1 mol (110.5 grams) of glyceryl monochlorohydrin and 1 mol (40 grams) of sodium hydroxide were then added; and the reaction effected as in Example III. The concentration of product in the resultant solution was about 16% by weight of product.

Each of the products of Examples I through V can be employed in all examples disclosed in aforementioned applications Ser. Nos. 640,389 and 476,193 (Pats. Nos. 3,398,198 and 3,398,097, respectively) in place of the less than totally propylated (beta hydroxy propyl) ethylene diamine particularly disclosed therein. The following are typical of all such examples.

EXAMPLE VI 1.0 kg. of the 16 percent solution of Example V are mixed with 0.032 kg. of commercial branch chain dodecyl benzene sulfonic acid (containing 88 percent of the sulfonic acid, 7 percent sulfuric acid, 1 percent unsulfonated oil, and 4 percent water, all by weight), and stirred until all of such sulfonic acid is reacted in the solution (the molar ratio of the intermediate to benzene sulfonic acid being about 1.0 to 0.15). This entire amount of the resultant salt solution is then diluted with 2.75 kgs. of water and stirred until the mixture is uniform. The resultant product has a pH of about 9.5 and a concentration of about 7.0 percent of the acid addition salt of dodecyl benzene sulfonic acid with the bis(beta hydroxy propyl) mono 1,2-dihydroxy propyl ethylene diamine.

Not only is such composition useful for blood removal but also for removing proteins or water soluble or water dispersible stains from fabrics in both laundry and dry cleaning plants. It is safe to use on colored garments which might otherwise be affected by other preparations strong enough to remove such type of stains. It possesses antibacterial properties and also serves as a deodorant on such stains, as blood, perspiration, urine, or the like.

In applying the blood remover, all that is necessary is to wash the stain by rubbing it with or immersing it in the solution until the stain disappears.

The dodecyl benzene sulfonic acid salt of the intermediate hereof can be used in conventional laundering and dry cleaning operations, and may be mixed with conventional laundry and dry cleaning agents including surfactants and wetting agents.

An aqueous solution of the dodecyl benzene sulfonic acid salt of the intermediate hereof is also an excellent cleaner for such hard surfaces as floors, waxed surfaces, linoleum, woodwork, terrazzo tile, plastic, chromium plated surfaces, stainless steel, enameled and porcelain ware, lacquered or painted automobile body surfaces, and the like. The following is a typical example of such composition:

EXAMPLE VII 1.41 kgs. of the 20 percent solution of the intermediate of Example III are mixed with 0.176 kg. of the aforementioned commercial dodecyl benzene sulfonic acid and with 1.934 kgs. of water, providing a concentration of the resultant salt of about 13 percent by weight of the solution; the molar ratio of the intermediate to benzene sulfonic acid being about 1.0 to 0.5, and the resulting pH about 8.5.

This solution of such concentration can be used directly in a conventional manner for washing the aforementioned hard surfaces but it is generally desirable to dilute the same with water, a preferable solution being about 1 oz. per gallon of water (1 to 128). In such concentration, the solution will effectively clean the aforementioned surfaces without damage thereto. For delicate finishes, it may be further diluted with water up to about 500 times the amount thereof. Advantages of such cleaning solution are its utility in water of varying degrees of hardness, ready rinsability, the absence of a film on the surface after cleaning, and the ability of the composition to remove soil and stains without affecting the finish of the surface to be cleaned, such as a waxed floor.

Should it be desired that wax be stripped from surfaces or that paint films be etched, all that is necessary in the composition of this example is to increase the ratio of the intermediate to dodecyl benzene sulfonic acid to obtain a higher pH.

Chelating or sequestering ability for metallic ions is an important property of cleaning or treating compositions, such as, for example, in metal finishing, in textile cleaning or processing, and the like. Prior to this invention many chelating type compounds have been employed, such as sodium tripolyphosphate, tetra sodium pyrophosphate, sodium gluconate, tetra sodium ethylene diamine tetra acetate, and the like. A disadvantage of these compounds has been their lack of sequestering ability on metal ions, such as iron, in or on mediums or environments having relatively high pH levels. For example, sequestering ability on iron starts decreasing drastically at pH 10 and falls off to substantially zero at pH 11.

The intermediate hereof in the molar ratio range of about 2.5 to 3.5 mols of hydroxy alkyl groups to 1 mol of ethylene diamine is very effective per se in sequestering metallic ions from mediums, generally liquid, particularly iron which is difficult to sequester in environments of a high pH of 11 to 12.

The product of Example III, namely tris 1,2-dihydroxy propyl ethylene diamine is particularly effective alone as a metal chelating agent particularly for iron under a high pH. It also possesses marked heat stability. Under the severe chelating test described below, it chelated 100 to 110 milligrams (mgms.) of iron per gram of active chelate.

The standard test comprises measuring at 25° C. the concentration at which the product will prevent precipitation of ferric hydroxide from aqueous ferric chloride solutions. Observation for ferric hydroxide precipitation is made after standing for 3 hours. A series of tubes containing varying amount of chelating agent per milligram of iron (Fe$^{+++}$) in aqueous solution are prepared. The tube in which no ferric hydroxide precipitation is observed after 3 hours standing is recorded as the chelating power expressed as milligrams of iron (Fe$^{+++}$) chelated per gram of active chelate.

Because this 3-hour test was not selective enough in determining values, the observation time was extended to 24 hours at ambient temperatures. Also, heat stability was recorded by placing the tubes under test in boiling water (about 100° C.) for 2 hrs., and under such severe condition, the heat stability test showed a chelating power of the product of Example III of about 100 to 110.

The less than fully hydroxy alkylated reaction products in the solutions having the concentrations of each of Examples I, II, III, IV and V were reacted in the manner disclosed in the aforementioned application, Ser. No. 652,183, namely by simple carboxymethylation, with monochloracetic acid and sodium hydroxide and in the appropriate molar ratios, to produce the essentially monosodium acetate salt of such products, having the following predominant structure wherein "A" represents the monosodium acetate salt (CH$_2$COONa):

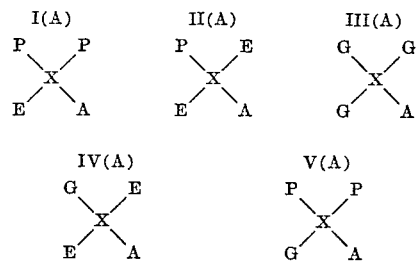

These were tested for iron chelation power in the manner noted above for the intermediate product of Example III. Also, the particular less than fully propylated product disclosed in aforementioned application, Ser. No. 652,183, namely the predominantly monosodium acetate salt of predominantly tris (beta hydroxy propyl) ethylene diamine having the following predominant structure was similarly tested:

The results are indicated by the following table which also includes the product of Example III for comparison. All tests were at a pH of 11.0.

TABLE I

| Product | Predominant formula | Number of hydroxy groups | Chelating power,[1] mgms. Fe$^{+++}$ per grm. active chelate at 25° C. | Heat stability at 100° C.,[2] mgms. Fe$^{+++}$ per grm. active chelate |
|---|---|---|---|---|
| Tris compound of S.N. 652,183 | P\X/P over P/X\A | 3 | 65–80 | [3] 0 |
| Product I(A) | P\X/P over E/X\A | 3 | 70–80 | [3] 0 |
| Product II(A) | P\X/E over E/X\A | 3 | 80–90 | [3] 0 |
| Example III | G\X/G over G/X\H | 6 | 100–110 | 100–110 |
| Product III(A) | G\X/G over G/X\A | 6 | 100–110 | 85–90 |
| Product IV(A) | G\X/E over E/X\A | 4 | 90–95 | 50–60 |
| Product V(A) | P\X/P over G/X\A | 4 | 90–95 | 60–70 |

[1] A range of chelating power is noted, because an exact point is not determinable without extensive analysis.
[2] Heat stabilities reported as substantially zero are for chelate to iron ratios used in the test method. These are not actually zero since a multifold increase in chelating agent to iron ratio would prevent precipitation even at the boiling point.
[3] Substantially.

From the above table it will be noted that the presence of at least 4 hydroxy groups in the total number of hydroxy alkyl groups in the respective compounds provides marked chelating power not only at 25° C. but imparts stability thereto at the boiling point which is very important in the hot tank cleaning of ferrous metals. Also, it will be observed that when the hydroxy alkyl groups are part of 3 glyceryl groups so that there are 6 hydroxy groups in the intermediate (Example III) without an acetate group, the chelating power is substantially the same, and even greater at boiling, as the same product of Example III(A) with the acetate group which ordinarily increases the chelating power of the intermediates hereof.

We claim:

1. The less than fully alkylated hydroxy alkyl ethylene diamine reaction product consisting essentially of a mixture of mono, bis, tris and tetra hydroxy alkyl ethylene diamine in which substantially all alkyl groups attached to nitrogen of the product consist essentially of hydroxy alkyl groups in the ratio of about 2.5 to 3.5 mols of hydroxy alkyl groups of 2–12 carbon atoms per mol of ethylene diamine, and the free hydrogen atom is attached directly to at least some of the nitrogen of the product.

2. The reaction product of claim 1 in which 2.8 to 3.3 hydroxy alkyl groups are attached to the nitrogen per mol of ethylene diamine and the product has the following predominant structure:

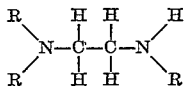

wherein R represents a 2–12 carbon atom hydroxy alkyl group.

3. The reaction product of claim 1 wherein at least one of the hydroxy alkyl groups is a 1,2-dihydroxypropyl group.

4. The reaction product of claim 2 wherein all the R groups are 1,2-dihydroxypropyl groups.

5. The reaction product of claim 1 wherein the total number of hydroxy groups in all the hydroxy alkyl groups is at least 4.

6. The reaction product of claim 1 in which at least one of the hydroxy alkyl groups is over 2 carbon atoms.

7. The reaction product of claim 2 wherein at least one of the R groups is over 2 carbon atoms.

References Cited

UNITED STATES PATENTS 1,988,225  1/1935  Wickert _____ 260—584 X
2,697,118  12/1954  Lundsted et al. _____ 260—584

CHARLES B. PARKER, Primary Examiner

P. L. RAYMOND, Assistant Examiner

U.S. Cl. X.R.

252—137, 152, 392; 260—439, 501.2